United States Patent [19]

Schmalz

[11] Patent Number: 5,127,264

[45] Date of Patent: Jul. 7, 1992

[54] METHODS OF INFRARED VISUALIZATION OF AIR FLOW

[75] Inventor: Henry H. Schmalz, Rockford, Ill.

[73] Assignee: Thermal Surveys, Inc., Rockford, Ill.

[21] Appl. No.: 702,409

[22] Filed: May 20, 1991

[51] Int. Cl.$^5$ .............................................. G01M 9/00
[52] U.S. Cl. .................................... 73/147; 73/861.05
[58] Field of Search ...................... 73/147, 117.4, 188, 73/189, 861.05, 861.95

[56] References Cited

U.S. PATENT DOCUMENTS

| | | | |
|---|---|---|---|
| 4,430,889 | 2/1984 | Sutton | 73/147 |
| 4,646,564 | 3/1987 | Ide et al. | 73/147 |
| 4,896,532 | 1/1990 | Schmalz | 73/147 |
| 4,925,296 | 5/1990 | Riechmuth | 73/861.05 |
| 5,072,612 | 12/1991 | Iverson, Jr. et al. | 73/147 |

Primary Examiner—Donald O. Woodiel
Attorney, Agent, or Firm—Leydig, Voit & Mayer, Ltd.

[57] ABSTRACT

An infrared visualized air turbulence method in which helium is mixed with a heavier-than-air tracer gas such as nitrous oxide in order to cause the density of the tracer gas to be approximately equal to the density of the ambient air stream under study. To enable more accurate measurement of the velocity of the air stream, tracer gas is injected into the stream in a direction extending substantially perpendicular to the direction of flow if the stream. In one of the methods of the invention, an infrared camera and a warm background are placed on one side of an air stream and reflective surfaces are located at opposite sides of the air stream in order to enable infrared visualization of air flow in situations where it is not possible to locate the camera and the warm background on opposite sides of the air stream.

5 Claims, 2 Drawing Sheets

METHODS OF INFRARED VISUALIZATION OF AIR FLOW

BACKGROUND OF THE INVENTION

This invention relates generally to methods of detecting turbulence in air flow and for measuring the velocity of air flow. More specifically, the invention constitutes improvements over the methods disclosed in Schmalz U.S. Pat. No. 4,896,532.

That patent discloses a method in which a tracer gas is introduced into a moving air stream. The tracer gas is a non-toxic gas such as nitrous oxide having a vibrational absorption frequency in the infrared range. A warm background is positioned at one side of the air stream while a filter-equipped infrared camera is positioned at the other side of the stream and is directed toward the warm background. The camera detects the flow pattern of the tracer gas and produces a permanent photographic images, turbulence in the air stream may be visualized and analyzed.

Nitrous oxide is heavier than air and this presents a particular problem when the tracer gas is injected into a horizontally flowing air stream. The heavier tracer gas tends to sink within the stream and does not follow the same trajectory as the stream. Sinking of the tracer gas also presents a problem when the tracer gas is injected into a substantially stationary air mass.

Also, the methods disclosed in the Schmalz patent do not lend themselves to use in applications where it is not possible to place the warm background and the infrared camera on opposite sides of the air stream under study. For example, when studying air stream escaping from leaks in a structure, it is often impossible or impractical to place a warm background directly adjacent the structure.

The Schmalz patent also discloses a method of measuring the velocity of an air stream by injecting pulses of tracer gas into the stream and by using the camera to detect and record parameters relating to the velocity of the stream. The manner in which the tracer gas is injected, however, makes it difficult to obtain in the stream a well-defined pulse whose velocity accurately reflects the velocity of the stream.

SUMMARY OF THE INVENTION

One of the objects of the present invention is to provide a new and improved turbulence detecting method in which the tracer gas is prevented from sinking in the ambient air mass and, in the case of a moving air stream, is caused to flow along substantially the same trajectory as the ambient stream.

A more detailed object is to achieve the foregoing by mixing helium with the nitrous oxide or other tracer gas in such proportions as to cause the density of the tracer gas to be substantially the same as the density of the ambient air under study.

Still another object of the invention is to provide an infrared visualization method which eliminates the need of placing a warm background adjacent an air-emitting structure and which enables the warm background and the camera to be placed on the same side of the air stream.

A further object of the invention is to inject tracer gas pulses into the air stream in a unique manner enabling more accurate velocity measurements to be made.

These and other objects and advantages of the invention will become more apparent from the following detailed description when taken in conjunction with the accompanying drawings.

DETAILED DESCRIPTION OF THE PREFERRED EMBODIMENTS

Figure 1:
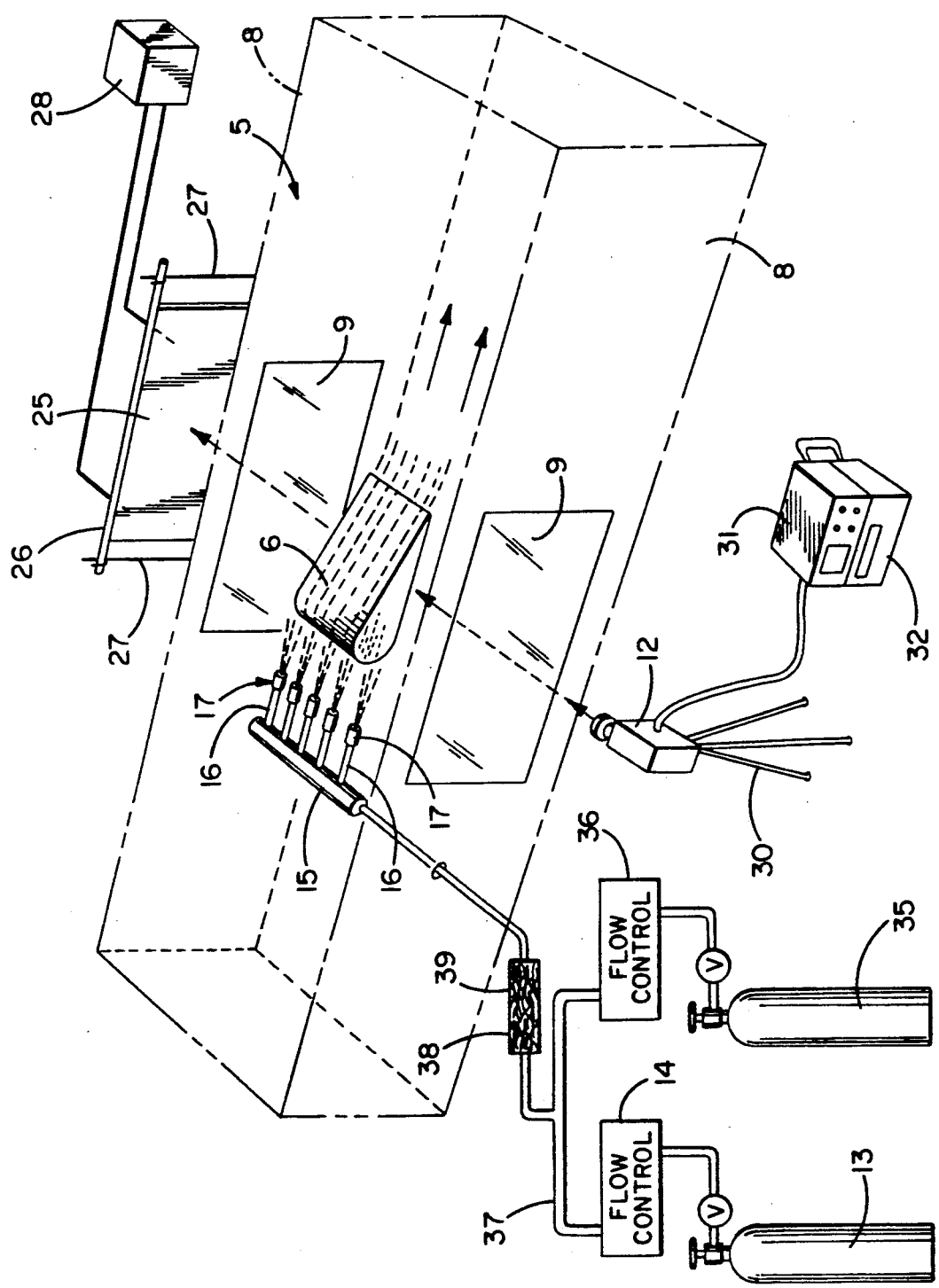
FIG. 1 is a perspective view of apparatus for carrying out one embodiment of a new and improved method incorporating the unique features of the invention.

In FIG. 1, the invention has been shown in conjunction with a wind tunnel 5 having an object 6 therein. A horizontal stream of ambient air is directed from left-to-right through the tunnel and across the object and is confined by the sides 8 of the tunnel, the sides having infrared transparent windows 9 therein.

The invention involves infrared visualization of turbulence and other characteristics of the air stream in the tunnel 5 as the air stream flows past the object 6. In general, this is achieved by introducing tracer gas into the air stream, by using an infrared camera 12 to take photographic images of the flow pattern of the tracer gas, and by using the output of the camera to produce permanent visual images for study purposes.

More specifically, the tracer gas which is used herein is heavier-than-air gas having a vibrational absorption frequency in the short infrared range of 2.0 to 5.6 microns. The tracer gas preferably should also be non-toxic, non-flammable and antiseptic. The preferred tracer gas is nitrous oxide ($N_2O$) although other gases such as carbon dioxide ($CO_2$) can be used in certain applications.

Streams of nitrous oxide are introduced into the ambient air stream in the tunnel 5 in the same direction as the ambient stream at a velocity substantially equal to that of the ambient stream. The nitrous oxide may be contained under pressure in a tank 13 and discharged from the tank at a predetermined rate determined by the setting of an adjustable flow control 14. Communicating with the tank upstream of the flow control is a horizontal manifold 15 where the flow preferably is divided into a plurality (herein, five) discrete and parallel streams although a single stream will suffice in some instances. As shown, five horizontally extending pipes 16 with nozzles 17 are spaced along the manifold and each discharges tracer gas horizontally into the ambient stream in the direction of flow thereof.

In order to enable the nitrous oxide streams to be detected and photographed by the infrared camera 12, a thermally uniform background 25 is positioned behind the streams, the temperature of the background being greater than that of the ambient air flowing through the tunnel 5 so that heat energy may be absorbed from the background by the camera. The preferred background comprises a uniform layer of filamentary carbon embedded in Teflon and sandwiched between two panels of polyester film. One panel of the film forms the forward or active face of the background 25 while the outer side of the other panel of film is thermally insulated with polyester foam and aluminum foil in order to increase the temperature of the active film with minimum interference to the ambient air. One suitable background is that designated as "THERMOFILM" and sold by Thermofilm Corp., Concord, Ontario, Canada.

The background 25 is supported in a vertical plane and behind one of the windows 9 of the tunnel 5 by a winding rod 26 which spans two supporting stands 27. A source 28 of electrical power is connected to the background and serves to heat the active face of the background to a temperature of between 100 and 115 degrees F. when nitrous oxide is used as the tracer gas.

The infrared camera 12 is supported on a tripod 30 in front of the other window 9 of the tunnel 5 and in such a position that the lens of the camera points toward the warm background 25. A suitable camera forms part of an infrared scanning system designated as an "AGEMA THERMOVISION 870" system.

The camera 12 is capable of operating in an infrared spectra having wavelengths ranging from about 2.0 microns to 5.6 microns. The camera is fitted with a band pass filter which reduces the sensing range to a narrow frequency band that substantially matches the vibrational frequency of the tracer gas. When the tracer gas is nitrous oxide, the filter which is used narrows the sensing range of the camera to a range of about 4,540 nanometers to approximately 4,580 nanometers. This is the range in which the nitrous oxide gas absorbs about ninety percent or more of the transmitted energy from the warm background 25.

Connected to the output of the camera 12 are an infrared camera display 31 (i.e., a cathode ray tube) and a video cassette recorder 32. The CRT displays the instantaneous output of the camera while the VCR makes a permanent recording of the output. It should be realized, however, that the VCR can be replaced by a still camera for making still negatives from the output of the camera 12.

With the foregoing arrangement, the background 25 provides a source of heat enabling the infrared camera 12 to detect the absorbed vibrational energy from the tracer gas and thereby detect the tracer gas streams and the flow pattern thereof. The output of the camera produces an image which shows the tracer gas streams as black smoke or streamers on a bright background. The streamers are indicative of turbulence in the ambient stream in the tunnel 5 and may be studied to determine the effect of the object 6 on the air stream or vice versa.

The nitrous oxide tracer gas is approximately fifty percent denser than ambient air. If pure nitrous oxide is used as the tracer gas, the gas tends to sink downwardly relative to the ambient air stream rather than flowing horizontally with the stream. Under such circumstances, the visual image of the tracer gas as produced by the camera 12 may not be truly representative of the actual flow of the ambient air stream.

In accordance with one aspect of the present invention, helium (He) is mixed with the nitrous oxide or other tracer gas in such proportions as necessary to cause the density of the tracer gas to be approximately the same as the density of the ambient air stream. As a result, the tracer gas follows the same trajectory as the ambient air stream and does not sink within the air stream due to the effect of gravity.

To achieve the foregoing, pressurized helium is contained in a tank 35 and may be discharged from the tank at a rate determined by the setting of an adjustable flow control 36. Both the flow control 36 and the flow control 14 communicate with the manifold 15 by way of a Y-connection 37.

In practicing the method, the flow control 14 is opened to allow an adequate quantity of nitrous oxide to flow from the tank 13 to the manifold 15 and out of the nozzles 17. With the camera 12 operating, the flow path of the nitrous oxide out of the nozzles 17 is visually monitored on the CRT 31. The flow control 36 then is opened to allow helium from the tank 35 to mix with the nitrous oxide, the flow control 36 being adjusted until the picture from the camera indicates that the flow from the nozzles 17 is absolutely horizontal. By thus viewing the picture from the camera and regulating the flow control 36, the ratio of helium to nitrous oxide may be adjusted so as to cause the density of the tracer gas to match the density of the ambient air at the prevailing barometric and temperature conditions. The tracer gas then will flow along the same path as the ambient stream rather than sinking in the stream due to gravity.

In order to effect intimate mixing of the helium with the nitrous oxide, a tube 38 filled with fiberglass 39 is connected to the manifold 15 just downstream of the Y-connection 37. This arrangement not only mixes the two gases but also dampens pulses which originate when the gases flow through the pressure regulators of the tanks 13 and 35.

The method as disclosed not only is useful in connection with a horizontally flowing air stream but also prevents the tracer gas from sinking under the influence of gravity when the tracer gas is injected into a stationary body of air. Mixing of the helium with the nitrous oxide also is advantageous when the tracer gas is injected vertically into a stream or into a stationary air mass.

Figure 2:
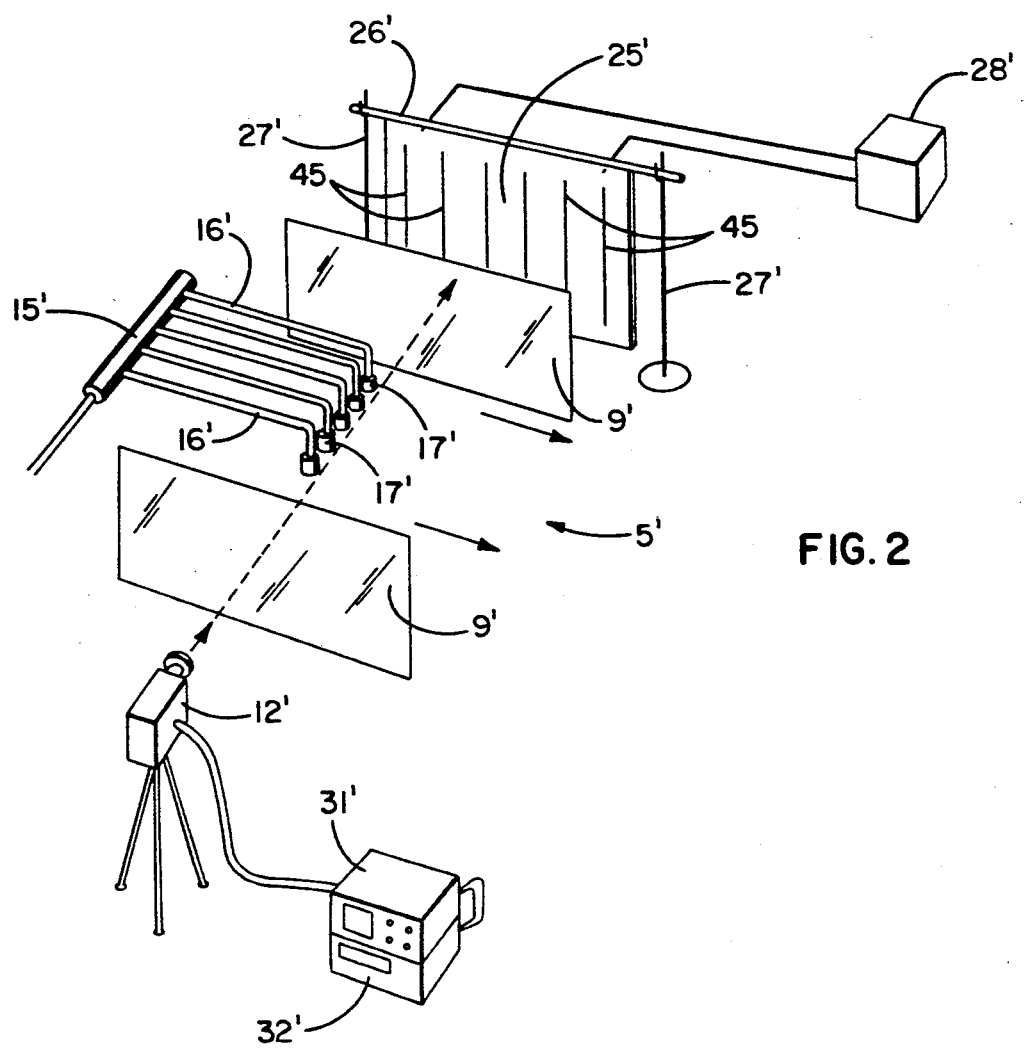
FIG. 2 is a fragmentary perspective view of the apparatus illustrated in FIG. 1 and showing the apparatus modified to enable accurate velocity measurements to be made.

FIG. 2 shows a system somewhat similar to FIG. 1 but used for measuring the velocity of the air stream. Components in FIG. 2 corresponding to those of FIG. 1 have been indicated by the same but primed reference numerals.

In order to measure the velocity of the air stream flowing horizontally through the tunnel 5', several vertically extending and equally spaced parallel lines 45 are placed on the active face of the warm background 25'. Tracer gas is injected into the air stream from at least one of the nozzles 17' in the form of intermittent pulses. The time required for a pulse to travel from one line 45 to the next is timed and is used to calculate the velocity of the air stream. The camera 12' and the CRT 31' are provided with means for displaying a continuously running time sequence on the CRT. Thus, by monitoring the time as displayed by the CRT for a pulse to travel from one line 45 to the next, the velocity of the ambient air stream may be calculated.

In accordance with the present invention, a more accurate velocity measurement is obtained by injecting the pulses of tracer gas into the ambient air stream in a direction extending perpendicular to the direction of flow of the air stream. In this particular instance, the end portions of the pipes 16' project downwardly at right angles relative to the main lengths of the pipes and thus the nozzles 17' discharge the tracer gas vertically downwardly into the horizontally flowing air stream. As a result, the pulses of tracer gas have no horizontal injection velocity component relative to the ambient stream and hence more accurately reflect the true horizontal velocity of the stream. Moreover, the right angle injection of the tracer gas pulses results in better defined pulses which appear as short blips on the monitor 31' rather than elongated blips as occur when the pulses are injected into the ambient stream in the direction of flow thereof.

Figure 3:
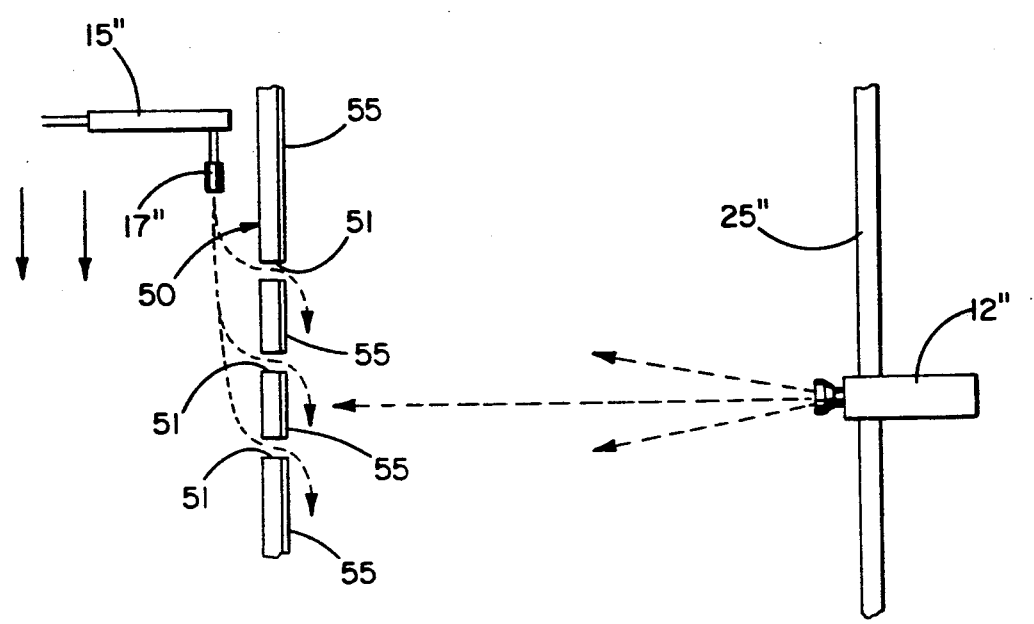
FIG. 3 is a top plan view of apparatus in which the warm background and the infrared camera are placed on the same side of the air stream under study.

In some cases, it is difficult or impossible to place a camera and a warm background on opposite sides of an air stream under study. By way of example, FIG. 3 shows a wall structure 50 such as a container wall having openings 51 therethrough which represent potential leak openings. Tracer gas is injected through a nozzle 17" inside of the container and flows through the openings 51. By viewing the escape of tracer gas on a CRT, the locations of the leak areas can be detected. It is not, however, practical to place a heated background on the outer side of the wall 51.

To overcome this problem, the present invention contemplates placing reflective surfaces 55 (e.g., an infrared coating or metal film) on the outer side of the wall 50 adjacent the openings 51 and on one side of the streams of tracer gas escaping through the openings. A warm background 25" is located on the opposite side of the tracer gas streams and is located adjacent a camera 12" as shown in FIG. 3.

With this arrangement, heat energy from the warm background 25" or any other source of infrared energy is transmitted through the tracer gas, is radiated off of the reflective surfaces 55 and is reflected back to the camera 12". Accordingly, the infrared energy from the warm background passes through the tracer gas twice before reaching the camera. This allows the tracer gas to be viewed with twice the sensitivity of a single axis arrangement of the type shown in FIG. 1. Moreover, the reflective surfaces 55 enable the tracer gas to be viewed in situations similar to that shown in FIG. 3 where it is not practical to place a heated background on the opposite side of the tracer gas from the camera.

I claim:

1. A method of visualizing air flow turbulence, said method comprising the steps of, providing a body of first gas having a predetermined density, injecting a stream of tracer gas into said first gas, the tracer gas comprising a mixture of helium and a second gaseous component having a density heavier than that of air and having a vibrational absorption frequency in the infrared range, providing a thermally uniform warm background in a generally vertical plane on one side of said stream, placing a camera on the other side of said stream with said camera being directed generally horizontally toward said background, said camera being operable to detect radiation in the infrared range and to provide an output in the visual range, said camera being equipped with a band pass filter capable of transmitting infrared radiation to a narrow frequency band that substantially matches the vibrational frequency of said second gaseous component of said tracer gas, taking photographic images of said stream with said camera, inspecting said images to compare the density of said tracer gas with the density of said first gas and, if such inspection reveals that the density of the composite tracer gas is different from the density of said first gas, adjusting the ratio of helium and said second gaseous component in said tracer gas sufficiently to change the density of the composite tracer gas to a value approximately equal to the density of said first gas.

2. A method as defined in claim 1 in which said body of first gas is a generally horizontally flowing stream of first gas, said tracer gas being injected generally horizontally into said stream of said first gas for flow in the same general direction as such stream.

3. A method as defined in claim 2 in which said second component of said tracer gas is selected from the group consisting essentially of nitrous oxide and carbon dioxide.

4. A method of visualizing air flow, said method comprising the steps of, creating a stream of tracer gas, the tracer gas having a vibrational absorption frequency in the infrared range, providing a thermally uniform warm background on one side of said stream, providing a reflector on the opposite side of said stream whereby infrared energy from said background is transmitted through said stream to said reflector and then is transmitted reversely through said stream by said reflector, placing a camera on said one side of said stream with said camera being directed toward said reflector, said camera being operable to detect radiation in the infrared range and to provide an output in the visual range, said camera being equipped with a band pass filter capable of transmitting infrared radiation to a narrow frequency band that substantially matches the vibrational frequency of the tracer gas, and taking photographic images of said stream with said camera.

5. A method of measuring the velocity of air flow, said method comprising the steps of, creating a stream of a first gas flowing along a substantially straight path, providing a thermally uniform background on one side of lines spaced from one another in the direction of flow of said stream, intermittently injecting pulses of tracer gas into said stream along a path extending substantially perpendicular to said first path, said pulses becoming entrained in said stream and moving along said straight path with said stream, the tracer gas having a vibrational absorption frequency in the infrared range, placing a video camera on the opposite side of said stream with the camera being directed toward said background, said camera being operable to detect radiation in the infrared range and to provide an output in the visual range, said camera being equipped with a band pass filter capable of transmitting infrared radiation to a narrow frequency band that substantially matches the vibrational frequency of the tracer gas, taking photographic images of said stream with said camera, said camera being equipped with means for producing on said images a continuous running time sequence, and viewing said images and determining the time required for a pulse of tracer gas to move from one of said parallel lines to another one of said parallel lines.

* * * * *